United States Patent [19]

Van Steenwyk

[11] 4,293,046
[45] Oct. 6, 1981

[54] SURVEY APPARATUS, METHOD EMPLOYING ANGULAR ACCELEROMETER

[75] Inventor: Donald H. Van Steenwyk, San Marino, Calif.

[73] Assignee: Applied Technologies Associates, San Marino, Calif.

[21] Appl. No.: 44,047

[22] Filed: May 31, 1979

[51] Int. Cl.³ .................. G01P 15/00; G01C 9/00
[52] U.S. Cl. .................. 175/45; 73/516 LM; 33/304
[58] Field of Search .......... 175/45, 40, 50; 73/515, 73/516 LM, 517 A, 521; 33/285, 304, 313, 346

[56] References Cited

U.S. PATENT DOCUMENTS

| | | | |
|---|---|---|---|
| 3,293,921 | 12/1966 | Riordan et al. | 73/516 LM |
| 3,315,224 | 4/1967 | Ferguson | 33/304 X |
| 3,732,883 | 5/1973 | Munch | 73/515 X |
| 3,753,296 | 8/1973 | Steenwyk | 33/304 |
| 3,789,935 | 2/1974 | Saadeh | 175/40 |
| 3,977,256 | 8/1976 | Wernstedt | 73/515 |

FOREIGN PATENT DOCUMENTS

| | | | |
|---|---|---|---|
| 1468418 | 3/1977 | United Kingdom | 73/516 LM |
| 620568 | 3/1975 | U.S.S.R. | 175/45 |

OTHER PUBLICATIONS

Anon. *Electronics*, McGraw Hill Inc., New York, N.Y., vol. 49, No. 26, p. 11E, 12E, Dec. 23, 1976.

*Primary Examiner*—James A. Leppink
*Attorney, Agent, or Firm*—William W. Haefliger

[57] ABSTRACT

A method of determining azimuth involves use of an angular accelerometer, and includes:

(a) rotating the accelerometer about a first axis while the accelerometer is carried on a body which is itself rotating about a second axis, and (b) detecting the accelerometer output of the accelerometer which is caused by said rotation.

The accelerometer may for example be rotated in a bore hole in the earth, with the first axis extending in the direction of the hole.

28 Claims, 10 Drawing Figures

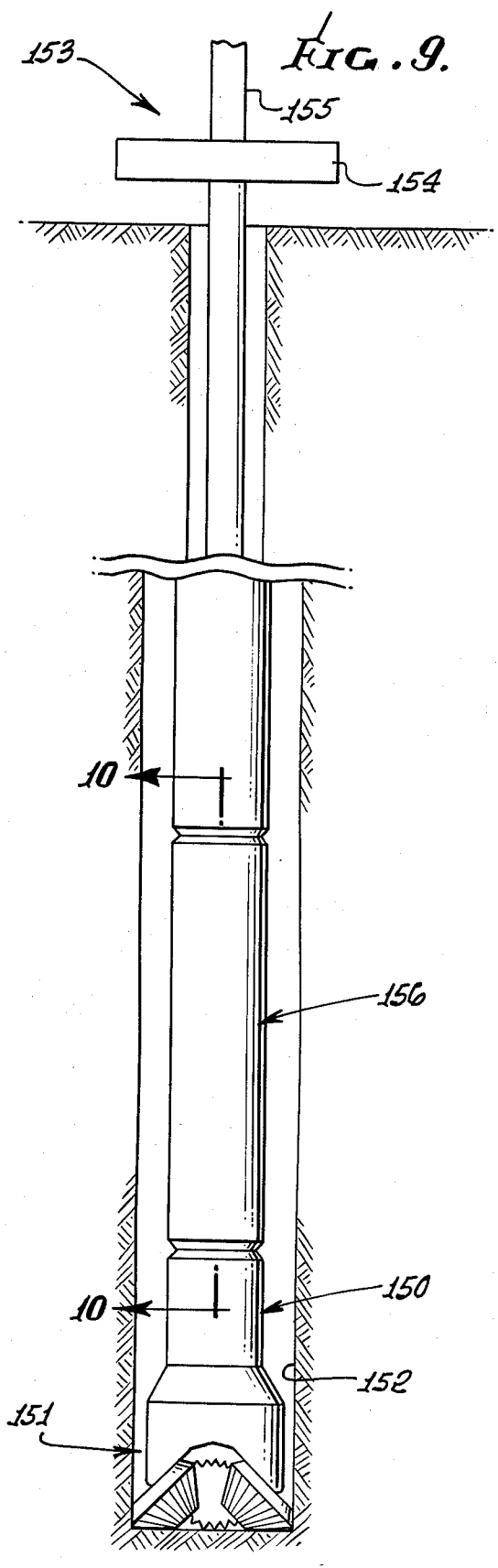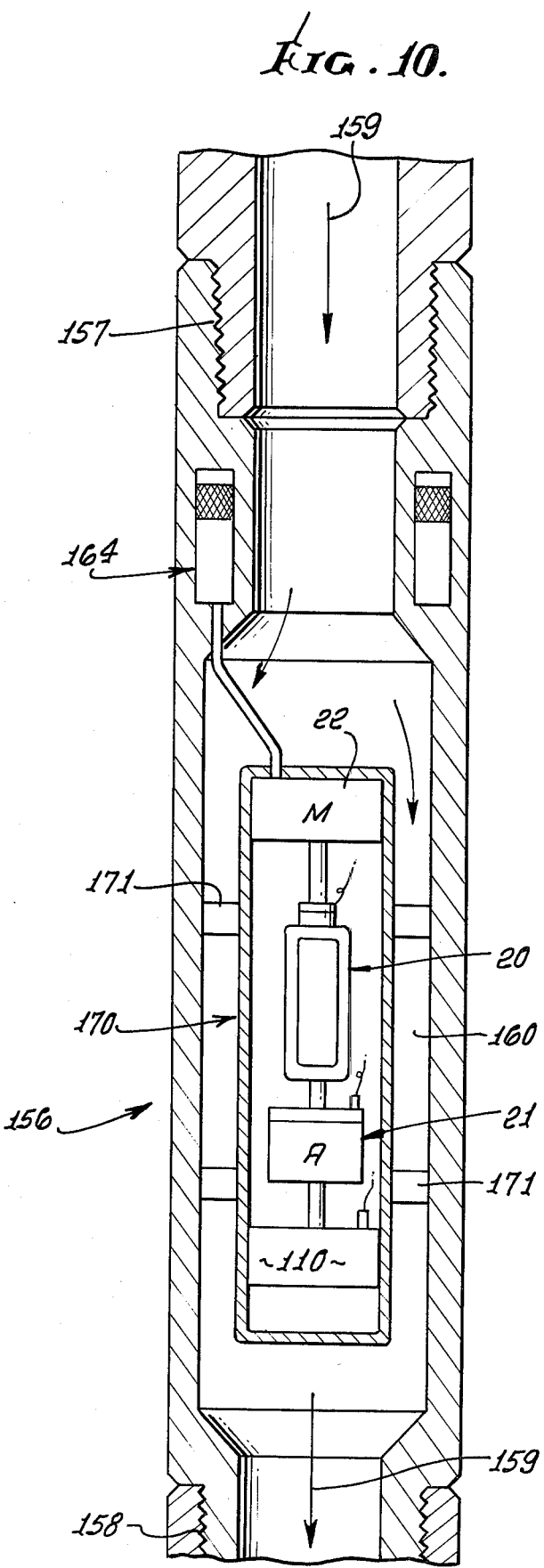

SURVEY APPARATUS, METHOD EMPLOYING ANGULAR ACCELEROMETER

BACKGROUND OF THE INVENTION

This invention relates generally to mapping, and more particularly concerns method and apparatus to remotely determine the azimuthal direction of a probe which is inserted into a bore hole or well. In addition, it concerns method and apparatus to determine the probe's degree of tilt from vertical and to relate the latter to generated azimuth information. Further, the azimuth determining apparatus by itself, or in combination with the tilt measuring apparatus, may be housed in a carrier of sufficiently small diameter to permit insertion directly into available small I.D. drill tubing, thus eliminating the need to remove the tubing to enable such mapping.

In the past, the task of position mapping a well or bore hole for azimuth in addition to tilt has been excessively complicated, very expensive, and often inaccurate because of the difficulty in accommodating the size and special requirements of the available instrumentation. For example, magnetic compass devices typically require that the drill tubing be pulled from the hole and fitted with a length of non-magnetic tubing close to the drill head. The magnetic compass device is located within this non-magnetic section and the entire drill stem reassembled and run back in the hole as measurements are made. Thereafter, the magnetic compass instrumentation package must again be removed, requiring another round trip of the drill string. These devices are very inaccurate where drilling goes through magnetic materials, and are unusable where casing has been installed.

Directional or free gyroscopes are deployed much as the magnetic compass devices and function by attempting to remember a pre-set direction in space as they are run in the hole. Their ability to remember degrades with time and environmental exposure. Also, their accuracy is reduced as instrument size is reduced, as for example becomes necessary for small well bores. Further, the range of tilt and azimuthal variations over which they can be used is restricted by gimbal freedom which must be limited to prevent gimbal lock and consequent gyro tumbling.

One apparatus capable of solving the above problems is disclosed in U.S. Pat. No. 3,753,296, and involves use of a rate gyroscope; however, such a device requires high speed rotating of a rotor, as well as other working parts. In this regard, it is very desirable that the number of moving parts be reduced to a minimum, or eliminated, in order to optimize reliability and accuracy. Also, gyroscopes have temperature sensitivity, which becomes an important factor in bore hole drilling.

SUMMARY OF THE INVENTION

It is a major object of the invention to provide method and means to overcome the above difficulties and problems, and to meet the need for a device that will produce accurate azimuth determinations as in bore holes for example, that does not require use of a gyroscope.

Basically, the invention involves use of an angular accelerometer which is rotated about a first axis which is normal to the input axis of the accelerometer, the accelerometer being carried on a body which is itself rotating about a second axis. The angular acceleration output of the accelerometer is then detected, such angular acceleration being produced by rotation about the second axis. That output increases and decreases as a sine wave function, and accelerometer orientation at the time of maximum output can then be utilized for azimuth determination.

As will be seen, the angular accelerometer may advantageously take the form of a fluid loop wherein the fluid tends to stay at rest when the loop is accelerated about an axis normal to the loop. Relative motion between the fluid and a loop shaped tube containing the fluid (i.e. liquid) is used to servo control a drive which acts to accelerate the fluid with the tube, the energization of the drive being detected to produce a measure of the angular acceleration undergone by the fluid loop. Such a device is particularly advantageous in bore hole mapping and also in drill stem guiding, as will be seen, due to the relatively few moving parts required. In regard to such uses, the loop is typically rotated in the bore hole about an axis extending in the direction of the hole, that axis being in the plane defined by the loop.

Accordingly, the apparatus for determining azimuth in accordance with the invention basically comprises (a) an angular accelerometer and drive means for rotating said accelerometer about a first axis.

(b) said accelerometer and drive means being rotated about a second axis, and (c) means for detecting the accelerometer output caused by said rotation.

As will be seen, the angular accelerometer may be employed by itself to determine azimuth, or it may be employed with a tilt sensing device which is also rotated with the angular accelerometer, and the outputs of both instruments employed in well mapping. In particular, the apparatus may be employed on a drill stem during a drilling operation for determining stem orientation so as to assist in accurate guiding of the stem during drilling.

Advantages of the invention include:

(a) rugged construction, which is a necessity when employed with a drill stem;

(b) temperature insensitivity;

(c) enables measurements of azimuth while drilling;

(d) the fluid tube form of the invention is well suited to tube elongation to increase inertia sensitive liquid mass and hence output amplitude.

These and other objects and advantages of the invention, as well as the details of an illustrative embodiment, will be more fully understood from the following description and drawings in which:

DRAWING DESCRIPTION

FIG. 9 is an elevation showing application of the invention to drill stem orientation; and FIG. 10 is an enlarged section on lines 10-10 of FIG. 9.

DETAILED DESCRIPTION

Figure 1:
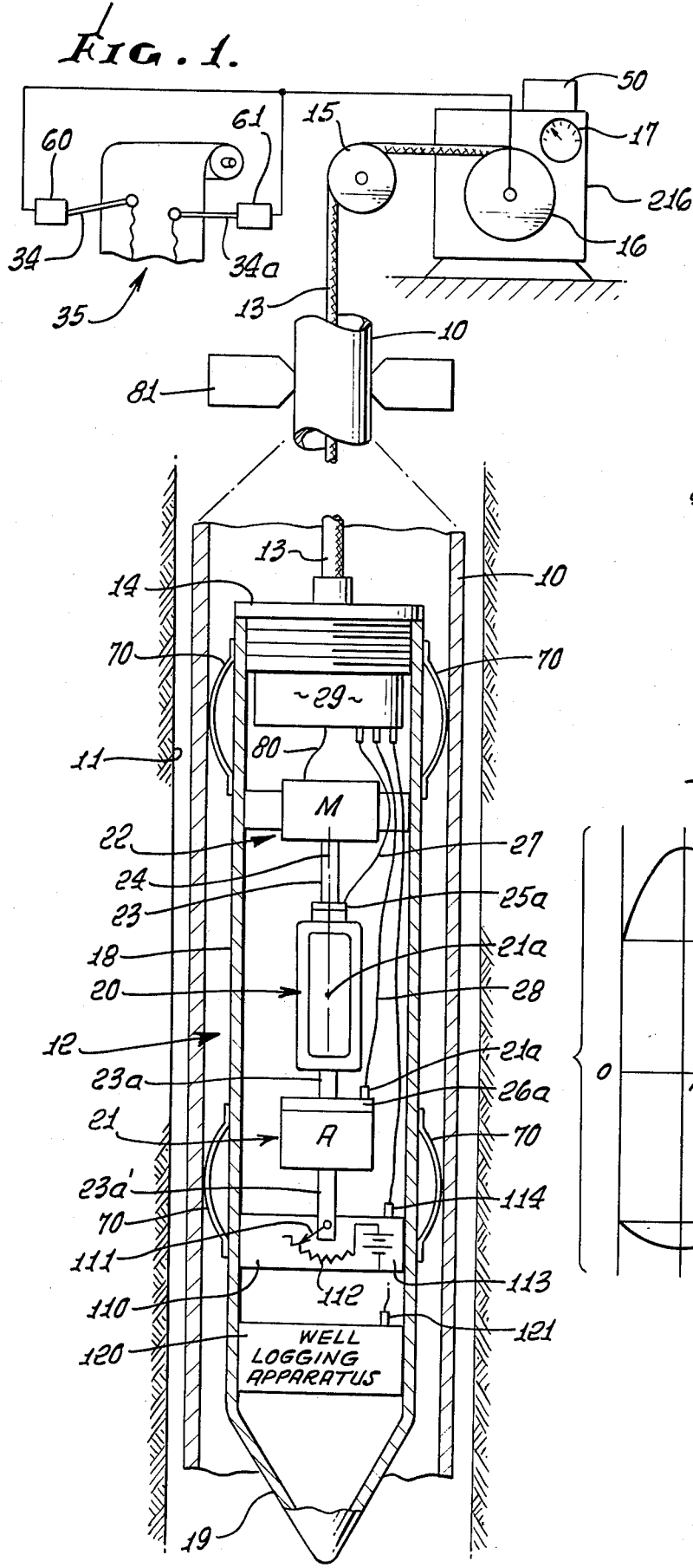
FIG. 1 is an elevation taken in section to show use of one form of instrument embodying the invention, in well mapping.

In FIG. 1, well tubing 10 extends downwardly in a well 11, which may or may not be cased. Extending within the tubing in a well mapping instrument or apparatus 12 for determining the direction of tilt, from vertical, of the well or bore hole. Such apparatus may readily be traveled up and down in the well, as by lifting and lowering of a cable 13 attached to the top 14 of the instrument. The upper end of the cable is turned at 15 and spooled at 16, where a suitable meter 17 may record the length of cable extending downwardly in the well, for logging purposes.

The apparatus 12 is shown to include a generally vertically elongated tubular housing or carrier 18 of diameter less than that of the tubing bore, so that well fluid in the tubing may readily pass, relatively, the instrument as it is lowered in the tubing. Also, the lower terminal of the housing may be tapered at 19, for assisting downward travel or penetration of the instrument through well liquid in the tubing. The carrier 18 supports angular accelerometer 20, a tilt sensitive device such as accelerometer 21, and drive means 22 to rotate the latter, for travel lengthwise in the well. Bowed springs 70 on the carrier center it in the tubing 10.

The drive means 22 may include an electric motor and speed reducer functioning to rotate a shaft 23 about axis 24 which is generally parallel to the length axis of the tubular carrier, i.e., axis 24 is vertical when the instrument is vertical, and axis 24 is tilted at the same angle from vertical as is the instrument when the latter bears sidewardly against the bore of the tubing 10 when such tubing assumes the same tilt angle due to bore hole tilt from vertical. Merely as illustrative, the rate of rotation of shaft 23 may be within the range 1 RPM to 5,000 RPM, or higher. The motor and housing may be considered as within the scope of primary means to support and rotate the accelerometer 20 and 21. The sensitive or input axis 21a of the angular accelerometer 20 is shown as normal to axis 24. Note also connection 23a.

Signals transmitted to and from the accelerometers 20 and 21 are transmitted via terminals at suitable slip ring structures 25a and 26a, and via cables 27 and 28 to the processing circuitry at 29 within the instrument, such circuitry for example including a suitable amplifier or amplifiers, and multiplexing means, if desired. See also the description of FIG. 4 herein. The multiplexed or non-multiplexed output from such circuitry is transmitted via a lead in cable 13 to a surface recorder, which for example includes pens 34 and 34a of a strip chart recorder 35, whose advancement may be synchronized with the lowering of the instrument in the well. The drivers 60 and 61 for recorder pens 34 and 34a are calibrated to indicate bore hole azimuth and degree of tilt, respectively, the run-out of the strip chart indicating bore hole depth along its length.

Figure 4:
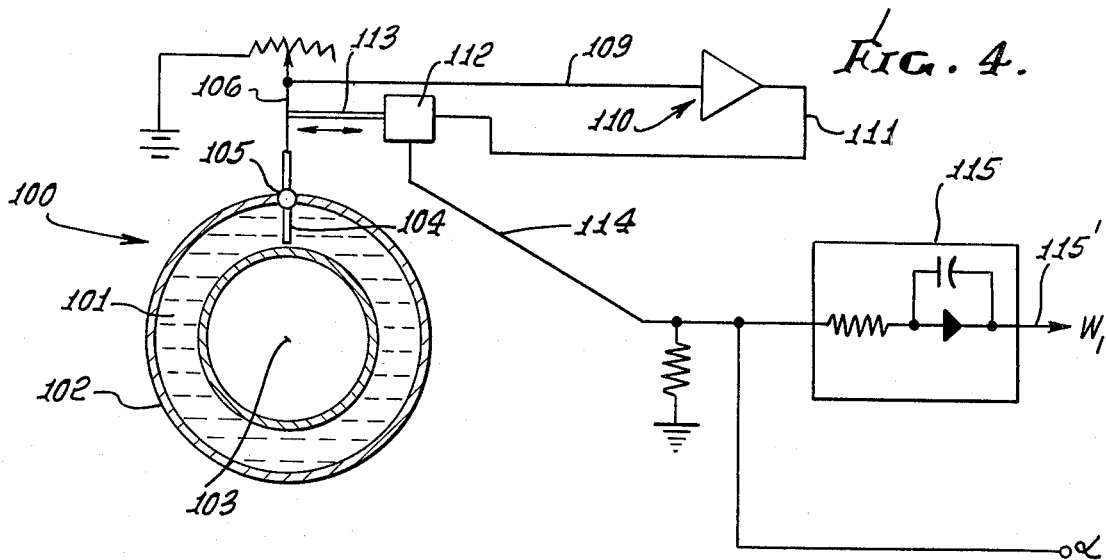
FIG. 4 is a diagrammatic representation of an angular accelerometer as employed in FIG. 1.

The angular accelerometer 20 is typically of the force balance type shown at 100 in FIG. 4. As such, an inertial mass 101 of liquid is confined within a tubular loop or ring 102. Any angular acceleration component tending to rotate the tube 102 about axis 103 normal to the plane of the drawing results in the liquid mass 101 tending to stay at rest relative to the tube. A vane or paddle 104 projects across the liquid in the tube, and is pivotally mounted as at 105 to the tube, whereby the vane tends to pivot as the tube is accelerated angularly about axis 103 relative to the "at rest" liquid in the loop. This pivotal motion is sensed by a potentiometer pick-off 106 connected to the vane, producing a corresponding electrical signal in lead 109. The signal is fed to servo amplifier 110, the output 111 of which is fed back to a torque motor 112 effectively connected at 113 to the vane 104. The motor 112 constantly drives the vane toward a null position, and the energization of the motor to achieve that result is sensed and fed at 114 to integrator 115. The signal thus transmitted to the integrator is proportional to angular acceleration $\alpha$. The integrator output is indicated at 115', and constitutes the angular rate (velocity) signal $\omega_1$. One such device as represented in FIG. 4 is Model 8160 Fluid Rotor Rate Sensor, a product of Systron-Donner Corporation, Concord, California.

Figure 6:
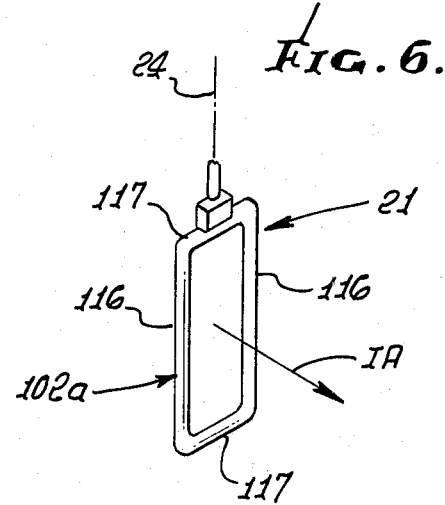
FIG. 6 is a perspective view of an angular accelerometer as employed in FIG. 1.

Referring to FIG. 6, it shows the angular accelerometer 20 of FIG. 1 in perspective, with its input axis IA projecting normal to the plane of the liquid containing tube 102a (which corresponds to tube 102 in FIG. 4). Note in FIGS. 1 and 6 that the tube has legs 116 which are elongated in the direction of the axis 24, providing more liquid mass in the tube, and increasing the sensitivity of the instrument, despite the shortness of transverse tube legs 117.

Figure 8:
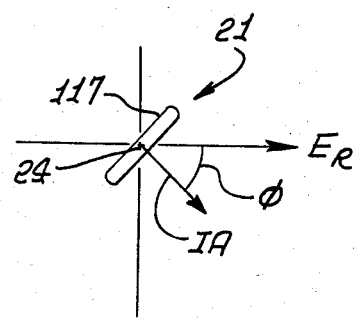
FIG. 8 is a schematic showing of the angular accelerometer relative to the earth's axis, or the vector representing earth angular necessity.

Refer now to FIG. 8, wherein the plane defined by legs 116 and 117 is normal to the plane of the drawing, with only one transverse leg 117 showing. Assuming that $E_R$ represents the earth's constant angular velocity vector, and that axis 24 is normal to that vector, and further that axis IA of the accelerometer extends at angle $\phi$ relative to $E_R$, the angular velocity or rate sensed by the angular accelerometer 21 is:

$$\omega_{IA} = E_R \cos \phi. \tag{1}$$

The sensed angular acceleration is then $$\alpha_{IA} = -\dot{\phi} E_R \sin \phi \tag{2}$$

Assuming now that the angular accelerometer 20 is rotated by motor 22, about axis 24, at a constant frequency f, then $\phi = 2\pi ft$, and:

$$\alpha_{IA} = 2\pi f E_R \sin (2\pi ft) \tag{3}$$

It can thus be seen that the value $\alpha_{IA}$ varies as a sine function between plus and minus maximum values, as the accelerometer is rotated, the maximum absolute value being:

$$\alpha_{max} = 2\pi f E_R \tag{4}$$

If axis 24 is not normal to vector $E_R$, then axis 24 will in general have a component which is normal to $E_R$, and the above analysis applies for that component.

Accordingly, the angular accelerometer output $\alpha_{IA}$ is azimuth determining in that it becomes a maximum when $\phi = 90°$, i.e. when IA is normal to $E_R$, which is directed toward North. In the above the angular velocity associated with $2\pi f$ may be represented by $\omega_1$, and the earth's angular velocity by the symbol $\omega_2$.

Also shown in FIG. 1 is circuitry 110, which may be characterized as a position pick-off, for referencing the angular accelerometer to the case or housing 18. Thus, that circuitry may be connected with the motor (as by wiper 111 on shaft 23a' turning with the tilt sensitive device 21 and with shaft 23), and also connected with the carrier 18 (as by slide wire resistance 112 integrally attached to the carrier via support 113), to produce an output signal at terminal 114 indicating azimuthal orientation of the angular accelerometer relative to the carrier. That output also appears at 215 in FIG. 7. As a result, the output at terminal 114 may be processed (as by surface means generally shown at 216 connected to the instrumentation by cable 13) to determine or derive azimuthal data indicating orientation of the carrier relative to the earth's spin axis. Such information is often required, as where it is desired to know the orientation of well logging apparatus being run in the well. Item 120 in FIG. 1 may be considered, for example, as well logging apparatus the output of which appears at 121. Carrier 18 supports item 120, as shown. Merely for purpose of illustration, such apparatus may comprise a radiometer to sense radiation intensity in the hole.

It will be understood that the recorder apparatus may be at the instrument location in the hole, or at the surface, or any other location. Also, the control of the motor 22 may be pre-programmed or automated in some desired manner.

Figure 2:
FIG. 2 is a diagram indicating tilt of the well mapping tool in a slanted well.
Figure 3:
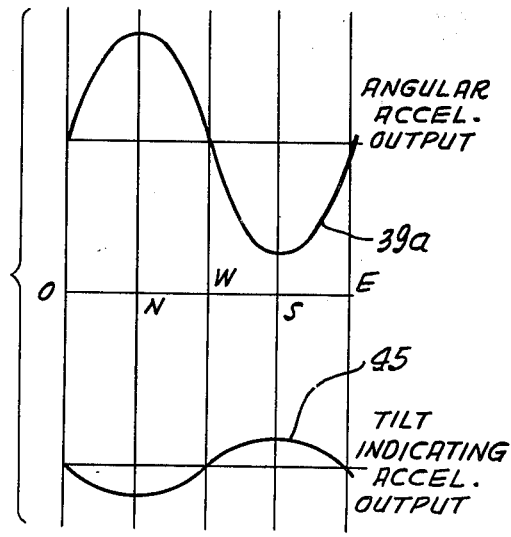
FIG. 3 is a wave form diagram.

The tilt sensitive device or accelerometer 21, of FIG. 3, which is simultaneously rotated with the angular accelerometer has an output as represented for example at 45 under instrument tilted conditions corresponding to tilt of axis 24 in North-South longitudinal plane; i.e. the accelerometer 21 output is maximized when the angular accelerometer output 39a indicates South alignment, and again maximized when the angular accelerometer output indicates North alignment. FIG. 2 shows tilt of axis 24 from vertical 46, and in North-South Plane, for example. Further, the accelerometer 21 maximum output is a function of the degree of such tilt, i.e., is higher when the tilt angle increases, and vice versa; therefore, the combined outputs of the devices 20 and 21 enable ascertainment of the azimuthal direction of bore hole tilt, at any depth measured lengthwise of the bore hole, and the degree of that tilt.

Figure 5:
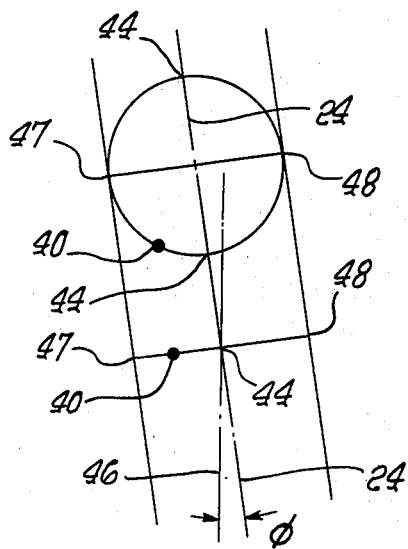
FIG. 5 is a diagrammatic showing of the operation of the tilt sensing accelerometer under instrument tilted conditions.

FIG. 5 diagrammatically illustrates the functioning of the accelerometer 21 in terms of rotation of a mass 40 about axis 24 tilted at angle $\phi$ from vertical 46. As the mass rotates through points 44 at the level of the intersection of axis 24 and vertical 46, its rate of change of velocity in a vertical direction is zero; however, as the mass rotates through points 47 and 48 at the lowest and highest levels of its excursion, its rate of change of velocity in a vertical direction is at a maximum, that rate being a function of the tilt angle $\phi$. A suitable accelerometer 21 is that known as Model 4303, a product of Systron-Donner Corporation, of Concord, Calif. FIG. 5 depicts both plan and elevation views.

Control of the angular rate of rotation of shaft 23 about axis 24 may be from surface control equipment indicated at 50, and circuitry 29 connected at 80 with the motor. Means (as for example a rotary table 81) to rotate the drill pipe 10 during well mapping, as described, is shown in FIG. 1.

Figure 7:
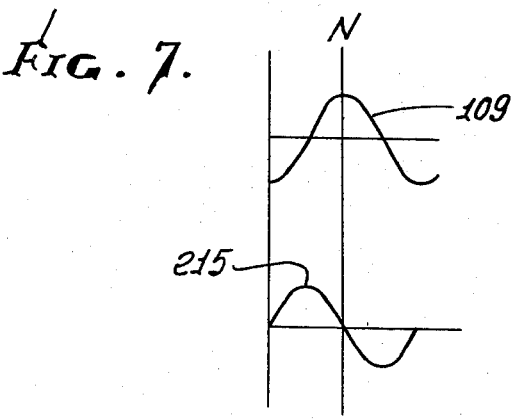
FIG. 7 is a wave form diagram.

Referring to FIGS. 1 and 7, the angular accelerometer 20 is characterized as producing an output which varies as a function of azimuth orientation of the loop or rotor 102a relative to the earth's spin axis, that output for example being indicated at 109 in FIG. 7 and peaking when North is indicated.

FIG. 9 shows another application of the invention, i.e. to determine orientation of a drill 150 during drilling by a bit 151 in a bore hole 152. A suitable means for rotating the drill stem is indicated at 153, and may include a conventional rotary table 154 and Kelly 155 connected to the stem. A sub 156 is connected into the stem near the bit, as better shown by pin and box connection 157 and 158 in FIG. 10.

Drilling mud circulates down through the drill pipe as indicated by arrows 159, and in the sub the mud may circulate downwardly through a passage or passages 160 outside a sealed container 170 connected at 171 to the sub. Within the container are the motor 22, angular accelerometer 20 tilt sensitive accelerometer 21, and shaft position pick-off 110 operating as referred to above to provide azimuth and tilt data. Such data may be transmitted to the surface for analysis by instrumentation like that described in FIG. 1. The transmission mode may be via radio frequency transmission within the drill stem in the manner described for example in U.S. Pat. No. 3,837,223. A modality to effect such transmission is shown at 164 within the sub body, schematically.

FIGS. 9 and 10 are representative, and other structural applications of the use of an angular accelerometer for drill stem orientation are contemplated.

Further, the use of a rotated angular accelerometer to determine the North direction, or azimuth, has many other applications, and may be used by itself or in combination with tilt sensing means of the type described herein.

I claim:
1. In the method of determining azimuth, and employing an angular accelerometer, the steps that include
    (a) rotating the accelerometer about a first axis while the accelerometer is carried on a body which is itself rotating about a second axis, and
    (b) detecting the acceleration output of the accelerometer which is caused by said rotation about the second axis.
2. The method of claim 1 including employing said output to determine azimuth orientation of said first axis relative to said second axis.
3. The method of claim 1 wherein said accelerometer comprises a fluid loop, and said rotation of the accelerometer is carried out about said first axis which is in a plane defined by the loop.
4. The method of claim 1 wherein said accelerometer is rotated in a bore hole in the earth.
5. The method of claim 1 wherein said accelerometer is rotated in a bore hole in the earth with said first axis extending in the direction of the bore hole.
6. The combination of claim 1 including a drill stem carrying said rotating angular accelerometer.
7. The method of claim 1 wherein said rotation of the accelerometer about said first axis is at a constant angular velocity $\omega_1$.
8. The method of claim 7 wherein said rotation of the body about the second axis is at a constant angular velocity $\omega_2$.
9. The method of claim 8 wherein value $\omega_2$ is a component of the earth's spin velocity.
10. The method of claim 1 including the step of supporting the accelerometer on drilling apparatus the orientation of which is to be determined, and operating said accelerometer during a drilling operation.
11. The method of claim 9 including the step of operating said apparatus to drill a bore hole, said first axis extending in the direction of said hole and said accelerometer output being used to determine bore hole orientation.

12. In apparatus for determining azimuth, the combination comprising
   (a) an angular accelerometer and drive means for rotating said accelerometer about a first axis,
   (b) said accelerometer and drive means being rotated about a second axis, and
   (c) means for detecting the accelerometer output caused by said rotation about the second axis.

13. The combination of claim 12 wherein said drive means rotates the accelerometer about said first axis at constant angular velocity.

14. The combination of claim 12 wherein the accelerometer comprises a fluid loop, and said first axis extends in the plane of the loop.

15. The combination of claim 14 including a carrier for said accelerometer and drive means, said carrier sized to be traveled in a bore hole.

16. The combination of claim 15 wherein said drive means comprises well tubing.

17. The combination of claim 15 wherein said drive means comprises a drill stem.

18. The combination of claim 15 wherein the carrier is located in a bore hole in the earth, and said first axis extends generally in the direction of the bore hole, said second axis being the earth's spin axis.

19. The combination of claim 18 wherein said fluid loop is elongated in the direction of the bore hole to increase the inertial mass of the fluid in the loop, thereby to increase the output of the accelerometer.

20. The combination of claim 15 wherein said carrier includes a housing supporting and containing said drive means and accelerometer, said drive means comprising a motor.

21. The combination of claim 20 including other circuitry operatively connected with the motor and housing to produce an output signal indicating azimuthal orientation of the rotating accelerometer relative to the housing, whereby said signal may be processed to determine azimuth orientation of the housing relative to the earth's spin axis.

22. The combination of claim 15 including well logging mechanism carried by the carrier.

23. The combination of claim 22 wherein said mechanism comprises instrumentation to quantitatively determine bore hole tilt from vertical.

24. The combination of claim 15 including a device supported and rotated by said drive means to produce an output which varies as a function of rotation of said angular accelerometer and of the degree of tilt of said accelerometer from vertical.

25. The combination of claim 24 including other circuitry responsive to the outputs of said angular accelerometer and of said device to produce an indication of the direction and degree of tilt of said bore hole at selected depth therein of said angular accelerometer.

26. In apparatus for determining azimuth, the combination comprising
   (a) an angular accelerometer and drive means for rotating said accelerometer about a first axis,
   (b) said accelerometer and drive means being rotated about a second axis, and
   (c) means for detecting the accelerometer output caused by said rotation about said second axis,
   (d) there being a housing for said accelerometer and drive means, said housing sized to be traveled lengthwise in a bore hole, the drive means comprising a motor,
   (e) there also being circuitry operatively connected with the motor and housing to produce an output signal indicating azimuthal orientation of the rotating accelerometer relative to the housing, whereby said signal may be processed to determine azimuth orientation of the housing relative to the earth's spin axis.

27. The combination of claim 26 including a device supported and rotated by said drive means to produce an output which varies as a function of rotation of said angular accelerometer and of the degree of tilt of said accelerometer from vertical.

28. In apparatus for determining azimuth, the combination comprising
   (a) an angle reference device and means for rotating same about a first axis,
   (b) said device being rotated about a second axis,
   (c) means for detecting the output of said device caused by said rotation about the second axis,
   (d) and a drill stem having a drill tool proximate the lower end of the stem, said device located proximate the drill tool.

* * * * *